| United States Patent [19] | [11] 3,894,158 |
| --- | --- |
| Miller | [45] July 8, 1975 |

[54] MANUFACTURE OF EDIBLE COLLAGEN CASINGS USING LIQUID SMOKE

[75] Inventor: Albert T. Miller, Somerville, N.J.

[73] Assignee: Devro, Inc., Somerville, N.J.

[22] Filed: Apr. 24, 1973

[21] Appl. No.: 354,053

[52] U.S. Cl. ................ 426/277; 426/140; 426/364
[51] Int. Cl. ............................................. A22c 13/00
[58] Field of Search ........... 426/105, 133, 135, 140, 426/276, 277, 332, 364

[56] References Cited
UNITED STATES PATENTS
3,664,844  5/1972  Miller ............................ 426/140 X FOREIGN PATENTS OR APPLICATIONS
1,122,505  8/1968  United Kingdom ................ 426/140

*Primary Examiner*—Hyman Lord
*Attorney, Agent, or Firm*—Herbert I. Sherman

[57] ABSTRACT

Edible collagen casings and films are prepared from an acid-swollen collagen extrusion mass which contains liquid smoke, said extrusion mass then being processed in normal manner by various prior art procedures to give casings and films which have increased in-process and finished product strengths and improved finished product clarity.

6 Claims, No Drawings

MANUFACTURE OF EDIBLE COLLAGEN CASINGS USING LIQUID SMOKE

This application relates to a new and useful process for the manufacture of edible collagen by continuous extrusion of an acid-swollen collagen extrusion mass which also contains liquid smoke and further relates to the extrusion mass containing liquid smoke used therein and also to the edible collagen which is made by said process and which will be in the form of a casing or film.

BACKGROUND OF THE INVENTION

Many ways of making edible collagen casing and edible collagen films are known and described in the patent literature. In particular, manufacture of casings by extrusion of swollen collagen fibers has been known since the 1930's as in Becker U.S. Pat. No. 2,046,541 and Becker U.S. Pat. No. 2,056,596. Then Liberman, U.S. Pat. No. 3,123,653 taught the production of exceedingly thin-walled collagen casings from a fluid extrusion mass of acid-swollen collagen fibrils having a solids content of 2.5–6.0 percent by extruding the fluid mass (gel or dispersion) in a tubular form into a concentrated solution of ammonium sulfate which coagulates and hardens the tubular body which is then washed, tanned, plasticized in liquid baths, and dried while inflated with gas under pressure. Fagan U.S. Pat. No. 3,535,125 improved on that process by extruding the extrusion mass of acid-swollen collagen fibrils in a tubular form into a gaseous ammonia atmosphere, which coagulated the tube, and supporting the tube on a moving belt until the ammonia has neutralized the acid present in the extrusion mass. Said Fagan U.S. patent actually teaches two processes. The first (shown in Examples 1–3 thereof) is where any plasticizer which is to be present is added to the extrusion mass and no treatment of the tubular body with liquid baths is required before the tubular casing is dried while inflated with gas under pressure; i.e. a completely dry process is involved. The second (Examples 5–7 thereof) is where the tube which is formed from the extrusion mass if acid-swollen collagen fibrils contains no plasticizer at the time of its formation and is treated with liquid washing baths and plasticizing baths before it is dried. Edible collagen films have been made as shown in Miller U.S. Pat. No. 3,664,844 by extrusion of an acid-swollen collagen extrusion mass containing collagen treated with a fungal protease derived from Aspergillus oryzae or Aspergillus flavus-oryzae, water, and plasticizer.

The processes of said Fagan U.S. Pat. No. 3,535,125 still resulted in certain disadvantages. In the first process, the in-process wet strength of the casing after coagulation in the ammonia atmosphere is fairly low which makes the casing difficult to process, i.e. to transport the casing through the dryer without undue breakage. In the second process, the resultant casing (when used as a sausage casing and rehydrated, which occurs when the casing picks up moisture from certain meat emulsions stuffed into it, especially those used for "hot dog" type frankfurters) tended to turn slightly milky in appearance upon standing, which consumers considered to be an objectionable feature. The process of said Miller U.S. Pat. No. 3,664,844 still had a disadvantage in loss of film clarity when contacted with moist food components over extended periods of use.

All of these disadvantages are somewhat alleviated by the present invention involving the use of liquid smoke in the acid-swollen collagen extrusion mass.

Liquid smoke is a well-known material or class of materials, which is also referred to as "liquid smoke solution," "wood-smoke condensate," "aqueous wood smoke condensate," "smoke liquid," "wood smoke distillate," "condensed smoke," "condensed smoke solution," "natural wood smoke flavor," "distillate obtained from cellulose-containing substances," and "liquid aqueous solution of smoke flavors." Various liquid smokes are known, all of which are believed usable in the present invention.

Liquid smoke often is a solution of natural wood smoke flavors prepared by burning a wood, for example, a hickory or a maple, and capturing the natural smoke flavors in a liquid medium, for example, water. Alternatively, the liquid smoke to be used may be derived from the destructive distillation of a wood, that is, the breakdown or cracking of the wood fibers into various compounds which are distilled out of the wood residue. Most liquid smokes are very acidic, although some partially neutralized liquid smokes are also available. The liquid smoke can be used at full strength are marketed or can be diluted by water or other appropriate diluent.

The liquid smoke that is preferred for use with this invention is a solution of natural wood smoke flavors. This liquid smoke is produced by the limited burning of hardwoods and the absorption of the smoke so generated into an aqueous solution under controlled conditions. The limited burning keeps some of the undesirable hydrocarbon compounds or tars in an insoluble form, thereby allowing removal of these constituents from the final liquid smoke. Thus, by this procedure, the desirable wood flavor constituents are absorbed into the solution in a balanced proportion and the undesirable constituents may be removed. The resulting liquid smoke solution is representative of the whole preferred spectrum of smoke flavors without a preference of any one type. The apparatus and method for manufacturing a typical liquid smoke of the preferred type is more fully described in the U.S. Pat. No. 3,106,473.

Certain liquid smokes have been approved for use in foods by the U.S. Food and Drug Administration and the Meat Inspection Division of the U.S. Department of Agriculture and many are available commercially, for example, under such trademarks as Charsol, Charoil, Liquid Hickory Smoke, and Griffith's Natural Smoke Flavor.

Liquid smoke previously has been used as a tanning agent for collagen casings but has never been applied in the same manner as it is used in the instant invention. Thus in Becker U.S. Pat. No. 2,103,138; Becker U.S. Pat. No. 2,157,319; and Braun U.S. Pat. No. 2,852,812, liquid smoke is used as a hardening agent to coat the already formed collagen casing and is applied by washing, spraying, squirting, painting, or immersion in a dip bath, to the exterior surface of an extruded casing, which is a fibrous hide collagen casing.

British Pat. No. 1,122,505 teaches tanning an extruded casing comprising hide collagen fibrils by contacting the already formed casing with a solution of liquid smoke at a pH of 4.0–7.0.

Lieberman U.S. Pat. No. 3,412,129 teaches the use of liquid smoke in a plasticizing bath as a replacement for a reducing sugar for an already formed collagen casing.

German Pat. No. 671,953, which is concerned with utilizing swollen fiber masses from animal skin substances to produce various "form elements" specifically excluding "sausage skins" (casings), contains a general statement without any details of the possible use of smoke condensate as an additive to a collagen fiber mass which is to be shaped into a form element and teaches that the smoke condensate used does not begin to produce any hardening or tanning effects on the collagen until later on in the process when the form element is being dried.

GENERAL DESCRIPTION OF THE INVENTION

None of the prior art patents teach the use of liquid smoke in a collagen casing prior to the time the casing actually has been extruded and formed. In the process of the present invention, the liquid smoke is introduced into the liquid mass of acid-swollen collagen prior to its extrusion as a tube or a film (where it begins to show its effects on the swollen collegan as shown by rheological studies). Any other ingredients which are normally used in the manufacturing of the casing or the film, e.g. cellulose, starch, carboxymethylcellulose, albumin, etc., may also be present if desired, and they will be used in the same manner and amounts as if liquid smoke were not being used for example, cellulose may typically be present in amounts ranging from 0.01 to 0.5 parts of cellulose to 1 part of collagen solids in the aforesaid extrusion mass.

The liquid smoke may be introduced into the acid-swollen collagen in any desired manner. Preferably it should either be mixed with the acid (which can be any acid customarily used, preferably lactic or hydrochloric acid) which is to be used in preparing the gel or else after the swollen collagen mass or gel has already been formed, the desired amount of liquid smoke can be added to it and become mixed and distributed throughout it. Since the liquid smoke is generally very acidic (often having a pH 2.5 or less), it is compatible with the gel system and, in fact, can replace a quantity of the swelling acid normally used.

The exact amount of liquid smoke to be used would depend on the desired end properties of the particular form of edible collagen to be made and may vary over a wide range. The level used is largely determined by the composition and concentration of the particular liquid smoke used. Amounts ranging from 0.01 to 2.0 parts liquid smoke to 1 part of collagen solids present (based on undiluted liquid smoke solution in its present commercially available form) appear to be usable with 0.1–.2 percent being currently preferred for collagen casings.

While the preferred forms of the invention involve the use of liquid smoke in making an acid-swollen collagen extrusion mass which is then extruded and treated according to the processes described in Fagan U.S. Pat. No. 3,525,125 and using the apparatus described therein, this invention is not to be regarded as so limited since the liquid smoke-containing extrusion mass could be processed by other known methods, for example, as shown in the other previously mentioned patent. Also the acid-swollen collagen used herein can be in the form of collagen fibrils or collagen fibers since the advantages of the present invention are attained with either form. It will be seen that the present use of liquid smoke in the extrusion mass invention has broad applicability since it is believed that liquid smoke can be incorporated successfully in all prior art acid-swollen collagen extrusion masses whether the collagen is fibrillar or fibrous in nature and whether the collagen is obtained from fresh hides, limed hides, unlimed (delimed) hides, salted hides, or is enzyme-treated, and whether the tubular casing or film after extrusion is coagulated in baths, such as ammonium sulfate, sodium sulfate, or in ammonia gas or otherwise, and no matter what further hardening or tanning steps are used and what plasticizing baths are used. Naturally, the further processing of the extruded casing or film should be done with apparatus and process steps adapted to the particular form of the extrusion mass used. Where casings, particularly sausage casings, are made by the processes of the present invention, they may either be used heat cured or uncured depending on the particular end use desired.

The liquid smoke exerts an apparent cross-linking effect on the acid-swollen collagen prior to extrusion, as can be seen by comparative rheological studies on acid-swollen collagen extrusion masses which are otherwise identical except that one contains liquid smoke while the other does not. In addition, there is a marked effect of the liquid smoke on the collagen after extrusion but prior to drying, which can be seen from comparing wet tensile strengths of in-process collagen casings and films.

The resultant edible collagens, which contain liquid smoke intimately and relatively uniformly dispersed throughout, offer increased tensile strengths and improved film clarity, which are important for many uses, e.g. in sausage casings and edible films.

DETAILED DESCRIPTION OF THE INVENTION

The following examples will illustrate certain preferred products and methods of carrying out the invention and will differentiate various properties of the edible collagens made with the process of the present invention from those which are made without the use of liquid smoke in the extrusion mass. In determining various properties, the following test procedures are referred to.

1. In-process Breaking Strength. After each wet processing step, sections of wet casing are cut from the continuous tube and stressed in a simple strain gauge apparatus (Chatillon Dial Gauge Model DPP) until they break. The maximum load (in grams) at the breaking point is recorded, the average of 5 to 10 determinations being recorded as the "in-Process Breaking Strength" or simply wet breaking strength.

2. Hot Acid Breaking Strength. The test is designed to show the degree of increase in strength as a result of treatments which promote a cure or cross-linking effect. It consists of treating the casing for one minute in 0.1N hydrochloric acid at 70°C. The casing is removed, mounted in a simple strain gauge apparatus (Chatillon Dial Gauge Model DPP) and pulled at a constant rate until breakage occurs. Results are reported as hot acid breaking strength in grams.

3. Wet Burst Strength. The test is a measure of the wet strength of a film sample and is defined as the ability of a film sample to support a 25 ml. column of distilled water at 30°C. It is measured by ascertaining the time interval before a film sample fails to support a 25 ml. column of distilled water at 30°C. The test is performed on a film sample which is supported between two circular plates to expose a 9.6 square centimeter area of unsupported film. The first indications of film separation or failure to retain the water is considered the Burst Point. These results are reported as time in minutes.

4. Isometric Shrink Tension (IST). The test is based on the fact that if collagen is heated to a high temperature (greater than its shrink temperature), it will undergo rapid shrinkage. If this shrinkage is inhibited by rigidly mounting the sample, then considerable tension will develop. This tension, called the isometric shrink tension, is directly related to the amount of intermolecular cross-links present in the collagen.

When testing hide pieces, the samples are taken from the center-back, parallel to the back line of the animal, approximately 1 cm. wide by 16 cm. long.

Measurement of the isometric shrink tension is accomplished by fixing one end of a test specimen to a transducing cell and rigidly mounting the other end. The sample is then placed in hot oil (95°C) and the tension developed recorded on a potentiometric recorder. The IST value is calculated by dividing the force a sample develops by its cross-sectional area. The cross-sectional area is the sample width multiplied by its thickness and the force developed is the final force minus the initial force applied during sample mounting.

$$IST = \frac{F}{A} = \frac{F_f - F_i}{wt}$$

where
$F$ is the force developed in kilograms,
$A$ is the cross-sectional area in square centimeters,
$w$ is the sample width in centimeters,
$t$ is the sample thickness in centimeters,
$F_f$ is the final force in kilograms,
$F_i$ is the initial force in kilograms, and
$IST$ is the isometric shrink tension in kilograms per square centimeter ($kg/cm^2$)

5. Rheological Tests (Shear stress). This test is designed to give a measure of the effective viscosity of the gel or extrusion mass and is useful in following changes occurring in the material as a result of chemical or physical effects. The values are also useful in predicting gel extrudability and uniformity.

A sample of gel is extruded at a controlled rate (shear rate) through a capillary tube (1/64 inch diameter × 1 inch long) and the force required (shear stress) to do so is recorded. Generally, the shear stress at a shear rate of 6827 $sec^{-1}$ is all that is measured, although in some instances the shear stress developed under these conditions is too high to be measured. In this case, the shear stress is determined at each of three lower shear rates (3414, 1707, and 683 $sec^{-1}$). A plot of log shear stress versus log shear rate is made and the resulting curve extrapolated to a shear rate of 6827 $sec^{-1}$ to obtain the shear stress at that point.

An Instron Tester (Model TM) and compression load cell (CCTM-Gold) is used in this test. Prior to testing, the gel sample should be equilibrated at a temperature of 25°±1°C. If a comparison is to be made between several different gels, the measured shear stress must be corrected for differences in hide solids and acid content. The shear stress value is reported in synes/cm² at the shear rate of 6827 $sec^{-1}$.

EXAMPLE I

Hide Preparation, Dehairing, and Unliming

Hides from freshly slaughtered animals are trimmed and sided. They are washed and soaked overnight in city water at 16°C. The following day they are are fleshed and weighed.

To a paddle vat with a capacity of 1100 gallons is added 3300 kgs. of water and 1270 kgs. of the fleshed hide. Forty-four and one-half kgs. (3.0%) of hydrated lime and 32 kgs. (2.5%) of sodium sulfide are added to the vat and the paddle is alternately run and stopped over a 15-hour period. The paddle remains idle an additional 9 hours after which the vat is drained and the hides are washed in city water (16°C) for 15 minutes. The paddle vat is refilled with a 1.0% lime solution, rotated 5 minutes, then allowed to rest an additional hour. The washed hides are then split on a leather-splitting machine. The hide, so processed, is characterized by an isometric shrink tension value of less than 3.2 $kg/cm^2$.

The corium layer is further processed to prepare the collagen for extrusion. A large wooden drum (capacity 3590 gallons) is charged with 2600 kgs. of hide corium prepared as described above, and 1110 gallons of water. The hide is washed in the drum for 30 minutes at a flow rate of 150 liters per minute. The wash is drained from the hide corium and the washed corium is treated in the drum with 1110 gallons of water containing 13 kgs. of ammonium sulfate for 2 hours, drained, and refilled with the ammonium sulfate solution. After paddling the hide an additional 2 hours, the vat is drained and hide corium is washed for 3 hours at a flow rate of 150 liters per minute. The water is again drained from the hide corium and the washed corium is treated in the drum with 1110 gallons of water containing 18 kgs. of hydrous citric acid and 24.5 kgs. of sodium citrate dihydrate. The drum is rotated for 16 hours with hourly adjustment of solution pH to maintain a solution pH of 4.6. At the end of this 16-hour treatment period, the citrate solution is drained and the hides are washed for 4 hours in running water at a flow rate of 150 liters per minute.

The hides, which have been dehaired with lime and then unlimed (delimed), are then shredded and ground to a particle size of approximately one-fourth inch.

EXAMPLE II

Preparation of Hide Dispersion

A mixture of 109.73 kgs. (31.13 kgs. dry hide solids) of the one/fourth inch ground hide particles prepared as described in Example I and 265.27 liters of water at 14°C is passed through a high speed cutting mill wherein the hide particles are shredded with rapidly rotating knives to form a hydrated mass of fibrous character.

In a stainless steel tank, 6.55 kgs. of cellulose fibers are thoroughly dispersed with 364.10 liters of water. To this cellulose dispersion is added 4.35 liters of 31.45% hydrochloric acid with complete mixing. The mass of fibrous hydrated collagen from the high speed cutting mill and the acid-cellulose-water mixture are pumped at equal flow rates through a common pipeline into a storage tank. Mixing of the collagen particles and cellulose occurs as the two solutions move through the common pipeline with acid swelling of the collagen particles. After storage for a period of 18 to 24 hours, the mixture of cellulose and acid-swollen collagen is further dispersed with a suitable homogenizer, such as a Manton-Gaulin homogenizer (Model 125-K-5BS), fitted with a two stage valve, and operated with a 1500 p.s.i. drop per stage. The homogenized mixture is pumped to a storage tank and deaerated under vacuum. The dispersion so obtained has the following composition:

|  | Percent |
|---|---|
| Hide Solids | 4.15 |
| Cellulose | 0.83 |
| Hydrochloric Acid | 0.18 |

EXAMPLE III

Extrusion and Casing Preparation and Testing

The apparatus and method depicted in Fagan U.S. Pat. No. 3,535,125 and particularly Examples IV–VII thereof is exemplary of what may be used to carry out the process of the present example. The homogenized dispersion prepared as described in Example II above is pumped from the storage vessel through a wound wire filter and then to a metering pump at a rate of 500 grams per minute. At a point just prior to entering the metering pump, a solution of liquid smoke condensate is delivered into the dispersion at a rate of 9.4 grams per minute. (The liquid smoke solution is fed from a pressurized supply tank through a constant delivery pump.) The extrusion mass consisting of the hidecellulose dispersion and Charsol C-6 liquid smoke solution (Red Arrow Products Co.) is pumped by metering pump through an in-line static mixer (Kenics Company, Danvers, Maine) where an intimate mixing of the dispersion and liquid smoke occurs. This extrusion mass which contains 0.45 parts liquid smoke to 1 part collagen solids present is then extruded through a disk extruder of the type illustrated in FIG. 1 of U.S. Pat. No. 3,122,788. The extruder is cooled by circulation of fluid through the jacket at 9°C. The extruded collagen casing is inflated with air and anhydrous ammonia is metered to the interior of the casing at a rate of about 1.2 grams per minute and to the exterior enclosure surrounding the casing at a rate of 2.3 grams per minute. The temperature of the extruded collagen is increased due to the work performed on the extrusion mass by the rotating extruder disks and the heat of neutralization. The maximum temperature of the casing should not be permitted to exceed 34°C. The diameter gauge is adjusted to control the diameter of the extruded casing at 20 ± 1 mm.

The extruded casing, supported on a conveyor belt, is flattened between pinch rollers and falls from the end of the belt into holding baskets within the water wash tank. The wet breaking strength of the casing as it leaves the conveyor belt is 288 grams. The casing is transferred through a series of compartments within the tank by the godets and is subjected to intimate contact with the wash water which circulates through the openings in the walls of each compartment. The total dwell time of the casing in the water wash tank is 20 minutes and the flow rate of fresh wash water through the tank is 15 liters per minute. The wet strength of the casing after water washing is 776 grams.

The plasticizer composition within the plasticizer tank is an aqueous solution of 4.6% glycerin and 1.25% carboxymethyl cellulose which circulates through the tank at a flow rate of 6 liters per minute. The total dwell time of the casing in the plasticizer tank is 10 minutes. Openings in the vertical walls of the compartments ccommunicate with the plasticizing solution in the tank and assure intimate contact of the casing with the plasticizer bath. The wet strength of the casing as it leaves the plasticizer bath is 782 grams. The casing which is a seamless tube of cohered collagen, from the plasticizing bath is dried, shirred, and humidified to a moisture content of 17–19%.

No heat cure treatment was given to this casing. The casing has a layflat of 34.5 mm., a wall thickness of 0.87 mils. and a hot acid breaking strength of 1338 grams. (A similar casing prepared without the addition of liquid smoke has a hot acid breaking strength of only 326 grams.) This casing gave satisfactory stuffing, linking, smoking, and cooking results as described below.

The casing of this Example III is stuffed with an all beef frankfurter emulsion and ty-linked. The frankfurters so obtained are smoked as follows:

The links are placed in an oven at room temperature. Air circulation is provided at a velocity of 200 fpm. Hardwood smoke is introduced and the temperature raised to 66°C. After an additional 20 minutes, the temperature is again raised to 82°C and maintained at this temperature for 10 minutes. When the internal temperature of the frankfurters reaches 71°–74°C, the smoke treatment is discontinued, and the links are cooled to 21°–27°C with a cold water spray and removed to a cold room to chill overnight.

Some of the frankfurter links were evaluated for cooking survival by grilling at 163°C for 20 minutes and by simmering in 82°–93°C water for 10 minutes. Others of the links were placed in a refrigerator at 2°–4°C for 10 days together with other smoked frankfurter links which were identical except they were made from collagen casings which did not contain liquid smoke. The links were then inspected for film clarity. Those made with the liquid smoke-containing casing looked clear and similar to links made with a natural casing while those links prepared using a similar casing without liquid smoke had a whitish, milky appearance. The casing of this Example III could contain up to 30% by weight of cellulose if this is considered desirable for the particular type of sausage to be made.

EXAMPLE IV

Hide Preparation

Another batch of hides from a different source was used to prepare corium layer ground to one-fourth inch particle size following the same procedure described in Example I except that the hides used are characterized by isometric shrink tension values greater than 3.2 kg/cm$^2$.

EXAMPLE V

Preparation of Hide Dispersion

A mixture of 79.01 kgs. (20.25 kgs. dry hide solids) of the one-fourth inch ground hide particles prepared as described in Example IV above and 46.33 kgs. (13.5 kgs. dry hide solids) of the one-fourth inch ground hide particles prepared as described in Example I above are blended with 249.66 liters of water at 0°C, and the mixture is passed two times through a high speed cutting mill wherein the hide particles are shredded with rapidly rotating knives to form a hydrated mass of fibrous character.

In a stainless steel tank, 7.10 pounds of cellulose fibers are thoroughly dispersed with 357.74 liters of water. To this cellulose dispersion is added 4.53 liters of 31.45% hydrochloric acid with complete mixing. The mass of fibrous hydrated collagen from the high speed cutting mill and the acid-cellulose-water mixture are pumped at equal flow rates through a common pipeline into a storage tank. Mixing of the collagen particles and cellulose occurs as the two solutions move through the common pipeline with acid swelling of the collagen particles. After storage for a period of ½ to 5 hours, the mixture of cellulose and acid-swollen collagen is further dispersed with a suitable homogenizer such as a Manton-Gaulin homogenizer (Model 125-K-5BS), fitted with a two stage valve and operated with a 1500 p.s.i. drop per stage. The mixture is aged an additional 14 to 20 hours, then homogenized a second time at 2,000 p.s.i. The homogenized mixture is pumped to a storage tank and deaerated under vacuum. The dispersion so obtained has the following composition:

| | Percent |
|---|---|
| Hide Solids | 4.50 |
| Cellulose | 0.90 |
| Hydrochloric Acid | 0.23 |

EXAMPLE VI

Extrusion and Casing Preparation and Testing

Following the procedure of Example III, the homogenized dispersion prepared as described in Example 5 above, is pumped from the storage vessel through a two stage filter bank. After filtration, the dispersion is fed to a metering pump at a rate of 500 grams per minute. At a point just prior to entering the metering pump, a solution of liquid smoke (Charsol C-6) is metered into the dispersion at a rate of 3.7 grams per minute. The extrusion mass consisting of the hide-cellulose dispersion and the liquid smoke solution is pumped from the metering pump into an in-line static mixer where an intimate mixing of the dispersion and liquid smoke occurs. The extrusion mass so obtained is extruded through a disk extruder of the type illustrated in FIG. 1 of U.S. Pat. No. 3,122,788. The extrusion rate is 20 grams per foot of casing and the extrusion speed is 25 feet per minute. The extruder is cooled by circulation of fluid through the jacket at 9°C. The extruded collagen casing is inflated with air and anhydrous ammonia is metered to the interior of the casing at a rate of about 1.6 grams per minute and to the exterior enclosure surrounding the casing at a rate of 0.8 grams per minute. The temperature of the extruded collagen is increased due to the work performed on the extrusion mass by the rotating extruder disks and the heat of neutralization. The maximum temperature of the casing should not be permitted to exceed 34°C. The diameter gauge is adjusted to control the diameter of the extruded casing at 31 ± 1 mm.

The extruded casing, supported on a conveyor belt, is flattened between the pinch rollers and falls from the end of the belt into holding basket within the water wash tank. The wet breaking strength of the casing as it leaves the conveyor belt is 474 grams. The casing is transferred through a series of compartments within the tank by the godets and is subjected to intimate contact with the wash water which circulates through the openings in the walls of each compartment. The total dwell time of the casing in the water wash tank is 40 minutes, and the flow rate of fresh wash water through the tank is 15 liters per minute. The wet strength of the casing after water washing is 1171 grams.

The plasticizer composition within the plasticizer tank is an aqueous solution of 6.0% glycerin and 1.1% carboxymethyl cellulose which circulates through the tank at a flow rate of 6 liters per minute. The total dwell time of the casing in the plasticizer tank is 15 minutes. Openings in the vertical walls of the compartments communicate with the plasticizing solution in tank and assure intimate contact of the casing with the plasticizing bath. The wet strength of the casing as it leaves the plasticizer bath is 1306 grams.

The casing from the belt is inflated with air and passed directly into the first section (80 linear feet) of a drying chamber which is heated to 82°C. The dwell time of the casing in the first section of the drying chamber is approximately 3 minutes. The inflated casing next enters a second section (26 linear feet) of the drying chamber which is heated to 60°C. The dwell time of the casing in the second section of the drying chamber is about 1 minute. The inflated casing then enters a third section (14 linear feet) of the drying chamber. The temperature in this third section is about 54°C, and the dwell time of the casing is about one-half minute. As the casing leaves the third section of the dryer, it is shirred on the apparatus described and claimed in U.S. Pat. No. 3,315,300. The shirred casing is heated in an oven from room temperature to 85°C over a period of 12 hours and maintained at 85°C for 6 hours. The shirred casing is finally humidified to approximately 20% moisture.

This casing has a hot acid breaking strength of 4436 grams. This casing was successfully stuffed with a smoked sausage emulsion and linked on a Handmann twist linker. The finished, smoked links were evaluated for color and appearance over a 1010-day period in a refrigerated, lighted showcase. The links produced with casing of this Example VI showed excellent color and appearance during this period while similar casings produced without liquid smoke in the extrusion mass showed poor color stability and loss in casing clarity under the same aging conditions. Cooking response was evaluated by placing the links in water and boiling for 10 minutes. All links prepared using casing of this Example VI survived this test.

EXAMPLE VII

Preparation of Extrusion Mass

A mixture of 79.01 kgs. (20.25 kgs. dry hole solids) of the one-fourth inch ground hide particles prepared as described in Example IV above, and 46.33 kgs. (13.5 kgs. dry hide solids) of the one-fourth inch ground hide particles prepared as described in Example I above, are blended with 249.66 liters of water at 0°C, and the mixture is passed two times through a high speed cutting mill wherein the hide particles are shredded with rapidly rotating knives to form a hydrated mass of fibrous character.

In a stainless steel tank, 7.10 kgs. of cellulose fibers are thoroughly dispersed with 357.74 liters of water. To this cellulose dispersion is added 4.53 liters of 31.45% hydrochloric acid and 5.63 kgs. of Charsol C-6 liquid smoke with complete mixing. The mass of fibrous hydrated collagen from the high speed cutting mill and the acid-cellulose-water mixture are pumped at equal flow rates through a common pipeline into a storage tank. Mixing of the collagen particles and cellulose-smoke dispersion occurs as the two solutions move through the common pipeline and then through a static mixer with acid swelling of the collagen particles. After storage for a period of ½ to 5 hours, the mixture of cellulose-liquid smoke and acid-swollen collagen is further dispersed with a suitable homogenizer such as a Manton-Gaulin homogenizer (Model 125-K-5BS), fitted with a two stage valve and operated with a 1500 p.s.i. drop per stage. The mixture is aged an additional 14 to 20 hours, then homogenized a second time at 2,000 p.s.i. The homogenized mixture is pumped to a storage tank and deaerated under vacuum. The extrusion mass so obtained has the following composition:

|  | Percent |
| --- | --- |
| Hide Solids | 4.50 |
| Cellulose | 0.90 |
| Hydrochloric Acid | 0.19 |
| Liquid Smoke Condensate | 0.75 |

EXAMPLE VIII

Casing Preparation

The homogenized extrusion mass prepared as described in Example VII above is pumped from the storage vessel through a two stage filter bank. After filtration, the dispersion is extruded at a rate of 20 grams per foot of casing and at an extrusion speed of 25 feet per minute. The casing is processed exactly as described in Example VI.

This casing has a wet breaking strength of 474 grams as it leaves the conveyor. The wet strength after water washing is 1171 grams and as it leaves the plasticizer bath is 1306 grams. (A similar casing made without liquid smoke had respective wet breaking strengths of 306, 639, and 850 grams.)

The casing so obtained has a hot acid breaking strength of 3103 grams. This casing was successfully stuffed with a smoked country sausage emulsion and linked on a Handtmann twist linker. The links prepared using this casing also showed satisfactory color stability over a 10-day storage period.

EXAMPLE IX

Casing Preparation

A collagen dispersion having the following composition was prepared as described in Example VII above:

|  | Percent |
| --- | --- |
| Hide Solids | 4.50 |
| Cellulose | 0.90 |
| Liquid Smoke Condensate | 0.25 |
| Hydrochloric Acid | 0.23 |

The extrusion mass was processed according to the procedures of Example VIII. The wet breaking strength of the casing at it leaves the conveyor belt is 472 grams. After water washing, it is 1028 grams and after the casing leaves the plasticizing bath it is 1227 grams.

This casing is heat cured in a forced draft oven raising the temperature slowly from 35°C to 85°C over a 12-hour period and continuing the heat treatment for an additional 6 hours at 85°C.

This casing has a layflat of 46 mm., a wall thickness of 1.6 mils, and a hot acid breaking strength of 4450 grams.

This casing gave satisfactory stuffing, linking, smoking, and cooking results under the conditions described in Example VIII. The links retained excellent color over a 10-day storage period in a lighted, refrigerated showcase.

EXAMPLE X

Preparation of Casing Without Use of Liquid Bath Processing Steps

This example uses the apparatus and method of Fagan U.S. Pat. No. 3,535,125 and particularly Examples I-III thereof.

A collagen dispersion having the following composition was prepared as described in Example II above:

|  | Percent |
| --- | --- |
| Hide | 4.35 |
| Cellulose | 0.40 |
| Glycerin | 0.90 |
| Liquid Smoke | 0.80 |
| Hydrochloric Acid | 0.15 |

The homogenized mass is pumped from a storage vessel through a wound wire filter and is extruded through a disc extruder of the type illustrated in FIG. 1 U.S. Pat. No. 3,122,788. With cooling water circulating through the extruder jacket, the inner and outer disc members are rotated at 107 rpm and the collagen mass is extruded at the rate of 247 grams (20 feet) per minute. The casing is inflated with air and anhydrous ammonia is metered to the interior of the casing at a rate of about 1.2 grams per minute and to the exterior enclosure surrounding the casing at a rate of 2.3 grams per minute.

The wet strength of the extruded casing increased rapidly as the ammonia completed the neutralization process. Eight to 10 minutes after extrusion, the casing had a wet tensile strength of 465 to 510 grams (a similar casing made without liquid smoke had a wet tensile strength of about 390 grams).

The casing was now of sufficient strength to allow continuous, high speed drying. The casing from the belt 13 is inflated with air and passed directly into the first section (80 linear feet) of a drying chamber which is heated to 71°C. The dwell time of the casing in the first section of the drying chamber is approximately 2⅔ minutes. The inflated casing next enters a second section (26 linear feet) of the drying chamber which is heated to 56°C. The dwell time of the casing in the second section of the drying chamber is about 1 minute. The inflated casing then enters a third section (14 linear feet) of the drying chamber. The temperature in this third section is about 32°C, and the dwell time of the casing is about one-half minute. As the casing leaves the third section of the dryer, it is shirred on the apparatus described and claimed in U.S. Pat. No. 3,315,300. The shirred casing is heated in an oven from room temperature to 85°C over a period of 12 hours and maintained at 85°C for 6 hours, prior to humidification.

The casing so obtained had a hot acid breaking strength of 678 grams while a similar casing prepared from an extrusion mass without the liquid smoke had a hot acid breaking strength of only 235 grams.

EXAMPLE XI

Use of Oil-Based Liquid Smoke

A mixture of 7.16 kgs. (2.0 kgs. dry hide solids) of the one-fourth inch hide particles prepared as described in Example I and 12.84 kgs. of water at 14°C is passed through a high speed cutting mill wherein the hide particles are shredded with rapidly rotating knives to form a hydrated mass of fibrous character.

In a stainless steel tank 0.421 kgs. of cellulose fibers are thoroughly dispersed with 29.1 kgs. of water. To this cellulose dispersion is added 0.234 kgs. of 37.5% hydrochloric acid and 0.250 kgs. Charoil oil-based, natural smoke condensate (Red Arrow Products Company) with complete mixing. The mass of fibrous hydrated collagen from the high speed cutting mill and the acid-cellulose-liquid smoke-water mixture are thoroughly mixed and aged for a period of 18 to 24 hours. Following aging, the swollen mixture is further dispersed with a suitable homogenizer, such as a Manton-Gaulin homogenizer (Model 125-K-5BS), fitted with a two stage valve and operated with a 1,500 p.s.i. drop per stage. The homogenized mixture is pumped to a storage tank and deaerated under vacuum. The dispersion so obtained has the following composition:

|  | Percent |
| --- | --- |
| Hide Solids | 4.00 |
| Cellulose | 0.80 |
| Hydrochloric Acid | 0.18 |
| Charoil Liquid Smoke | 0.50 |

The homogenized dispersion is aged an additional 18–24 hours and filtered through a wound wire filter having 6 mil openings. The extrusion mass, so prepared, is extruded accordingly to the procedure of Example III and the resulting casing and test results were very similar to those shown in Example III.

EXAMPLE XII

Edible Film

The corium of fresh steer hides is ground in a meat grinder until it will pass a one-fourth inch screen. To 5350 g. of the ground hide corium (1520 g. dry hide solids) is added 9,630 g. water, 15 g. Rhozyme P-11 fungal protease derived from Aspergillus oryzae or Aspergillus flavus-oryzae (Rhom and Haas), 3.0 g. sodium benzoate, and 1.5 g. sodium propionate. The slurry of collagen in the aqueous solution is finely ground in a Mikro-cut grinder (A. Stephan u. Sohn, Hameon, Weser, Germany). After two passes through the Mikro-cut grinder, the slurry is mixed with 5,000 g. of aqueous solution containing 450 g. glycerin and 37.5 g. citric acid and 15 g. Charsol C-6 liquid smoke. The mixture is blended by passing it through a Butcher Boy meat grinder (Lasar Manufacturing Co., Inc., Los Angeles, California) fitted with a plate having one-fourth inch diameter holes. A second pass is made through this grinder using a plate or head having 5.56 inch diameter holes. The swollen mixture is incubated at 32°C for 24 hours. At the end of this 24-hour period, the dispersion or gel is homogenized under a pressure of 3000 pounds per square inch and deaerated. It is then filtered through a 34 mil slotted filter screen (Ronningen-Petter Co., Kalamozoo, Michigan) to remove any unswollen particles and foreign material.

The extrusion mass is metered through a metering pump which maintains a constant feed of dispersion under pressure to the extruder inlet. The extruder used is an adjustable lip, slit die extruder of the type where the inlet of the extruder is narrow, but the opening fans out progressively and is widest at the outlet. The gap clearance within the extruder also varies, being narrowest at the middle and widest at the outermost edges. Extruders of this type produce uniform delivery of dispersion along all points on the dip lips. The collagen dispersion entering the extruder inlet is forced into a fan-shaped pattern as it moves through the extruder and out of die lips where it drops at a uniform rate from the bottom of the extruder, which is positioned directly above an endless belt.

As the resulting formed sheet of dispersion leaves the extruder, it is immediately cast onto an endless belt, preferably one having a high-release surface. A suitable high-release surface for casting these dispersions is Mylar polyester film (E. I. DuPont De Nemours and Co., Inc., Wilmington, Delaware). The endless casting belt is driven by drums connected to a constant drive system.

The formed sheet of dispersion is conveyed on the endless moving casting belt into a warm air dryer. The dryer used is one built in two sections: an upper plenum for delivery of heated air and a lower drying chamber directly below the plenum, which is the part through which the endless belt actually passes. Heated air is forced by a fan into the plenum and then caused to move through a series of slots in its base, across the surface of the dispersion moving through the drying chamber on the endless belt. Vapor laden air is removed from the drying chamber through exhaust ports by a section fan. The warm air in the drying chamber is at 60°–70°C and the velocity of the air at the exit of the plenum is 6,000 to 10,000 feet per minute.

As the formed sheet of dispersion moves through the drying chamber and becomes partially dehydrated, it begins to take on the properties of a continuous flexible film. At the tail end of the drying chamber, the dehydrated "dried" film has a moisture content of from 7 to 10 percent. At this point, the film has enough strength and continuity to be released from the casting surface. "Dryness" is an important factor in the ability of the film to release from the casting surface. Nonuniformity in drying or the presence of "wet spots" in the film can cause serious problems.

The dry collagen film may be conveyed through a tension sensing device as part of a constant windup system to be wound onto a corrugated core as a roll of film ready for use. Optionally, the dry film may be treated with gaseous ammonia as it is wound onto the corrugated core.

Typical films made by the process described above are generally from 0.75 to 1.25 mils in thickness, depending on the original wet film thickness extruded from the die. Extruded, formed sheet dispersions of approximately 8.0 mil thickness and containing 7.5 to 8.0 percent hide corium solids will generally dehydrate to yield films of approximately 1.0 mil thickness. The films are clear and transparent and have improved wet burst strengths over similar films prepared without liquid smoke in the extrusion mass, e.g. about 6.8 minutes versus 3.2 minutes for the film made without liquid smoke.

When the film of this Example XII was used in contact with meat emulsions over extended periods of storage (i.e. up to ten days) the film remained clear and transparent while a similar film made without the use of liquid smoke was found to become somewhat "milky" and opaque.

EXAMPLE XIII

Preparation of Casing From Enzyme-Treated Collagen Derived from Fresh Hides

The corium of fresh steer hides is ground in a meat grinder until it will pass a one-fourth inch screen. To 10.43 kgs. (2.84 kgs. dry hide solids) of the ground hide corium is added 0.028 kgs. Rhozyme P-11 Fungal Protease (Rohm and Hass), 0.028 kgs. liquid smoke, and 15.51 kgs. water at 14°C. The slurry of collagen in the aqueous solution is finely ground in a Mikro-cut grinder (A. Stephan u. Sohn, Hameon, Weser, Germany). After two passes through the Mikro-cut grinder, the slurry is mixed with 14 kgs. of aqueous solution containing 0.28 kgs. Cellufloc PB-33 (Georgia Pacific refined wood cellulose), 0.825 kgs. glycerin, and 0.165 kgs. of 37.5% hydrochloric acid. The mixture is blended by passing it through a Butcher Boy meat grinder (Lasar Manufacturing Co., Inc., Los Angeles, California) fitted with a plate having one-fourth inch diameter holes. The swollen dispersion is incubated at 30°C for 24 hours. At the end of this 24-hour period, the dispersion or extrusion mass is homogenized under a pressure of 3,000 pounds per square inch and deaerated under vacuum. The extrusion mass so obtained has the following composition:

|  | Percent |
| --- | --- |
| Hide Solids | 7.100 |
| Cellulose | 0.700 |
| Glycerin | 2.130 |
| Hydrochloric Acid | 0.413 |
| Rhozyme P-11 Fungal Protease | 0.071 |
| Liquid Smoke | 0.071 |

The extrusion mass so obtained was extruded accordingly to the procedure of Example X except that the extrusion rate was 11.5 grams per foot of casing and the extrusion speed was 13.5 feet per minute. The wet strength of the casing immediately after extrusion and coagulation was 487 grams and after five minutes was 595 grams. The casing was of sufficient strength to enable continuous, high speed drying. (A similar casing prepared from a similar extrusion mass without the addition of liquid smoke did not develop sufficient in-process wet strength to be continuously dried in the same manner.)

The dried, shirred casing is heat cured in a forced draft oven raising the temperature slowly to 90°C during a 12-hour period with heat treatment continuing at 90°C for an additional 12 hours.

This casing has a layflat of 42 mm., a wall thickness of 1 mil, and a hot acid breaking strength of 1920 grams. This casing gives satisfactory stuffing, linking, and cooking results under the conditions described below:

The casing of this Example XIII is stuffed with a fresh Italian sausage emulsion and linked on a Famco Linker. The links are evaluated for cooking survival by grilling at 149°C for 20 minutes.

EXAMPLE XIV

Preparation of Casing from Enzyme-Treated Collagen Derived from Limed Hides

Hides from freshly slaughtered steers are trimmed and sided. They are washed and soaked overnight in city water at 16°C. The following day they are fleshed and weighed.

To a paddle vat with a capacity of 1,100 gallons is added 3,380 kgs. of water and 770 kgs. of the fleshed hide. One hundred fifty-nine kgs. of hydrated lime is added to the vat, and the paddle run for 5 minutes, allowed to remain idle 8 hours, run for 5 minutes, then allowed to remain idle overnight. During the next 6 days, this same procedure is followed, i.e. paddle 5 minutes in the morning and 5 minutes in the evening. After seven full days in lime, the solution is drained and the hides are removed for fleshing and splitting.

The corium layer is further processed to prepare the collagen for extrusion. A large wooden drum is charged with 2,600 kgs. of hide corium prepared as described above and 1,110 gallons of water. The hide is washed in the drum for 30 minutes at a flow rate of 150 liters per minute. The wash water is drained from the hide corium and the washed corium is treated in the drum with 1,110 gallons of water containing 13 kgs. of ammonium sulfate for 2 hours, drained and refilled with the ammonium sulfate solution. After paddling the hide an additional 2 hours, the vat is drained and hide corium is washed for 3 hours at a flow rate of 150 liters per minute. The water is again drained from the hide corium and the washed corium is treated in the drum with 1,110 gallons of water containing 18 kgs. of hydrous citric acid and 24.5 kgs. of sodium citrate dihydrate. The drum is rotated for 16 hours with hourly adjustment of solution pH to maintain a solution pH of 4.6. At the end of this 16-hour treatment period, the citrate solution is drained and the hides are washed for 4 hours in running water at a flow rate of 150 liters per minute. The hides are removed from the drum and are shredded and ground to a particle size of approximately one-fourth inch.

The hide one-fourth inch grind is used in preparing an extrusion mass as in Example XIII but having the following composition:

|  | Percent |
| --- | --- |
| Hide Solids | 7.100 |
| Glycerin | 1.065 |
| Propylene Glycol | 1.065 |
| Lactic Acid | 2.472 |
| Rhozyme P-11 Fungal Protease | 0.071 |
| Liquid Smoke | 0.071 |

The resultant casing also gives satisfactory stuffing, linking, and cooking results under the conditions described in Example XIII above.

EXAMPLE XV

Rheology of Collagen Extrusion Mass

Experimental dispersions were prepared to contain 4% hide solids, 0.8% cellulose, and 0.18% hydrochloric acid according to the procedures of Example II. Varying amounts of liquid smoke condensate were added to the dispersions to obtain concentrations of 0, 0.7, 1.3, and 3.4% respectively. Viscosity was determined on each of the resultant experimental extrusion masses using the Capillary Extrusion Rheometer at a shear rate of 6827 sec$^{-1}$.

| Sample No. | Liquid Smoke Content (% by weight) | Shear Stress (dynes/cm$^2$ × 10$^{-3}$) |
|---|---|---|
| 1 | 0 | 88 |
| 2 | 0.7 | 96 |
| 3 | 1.3 | 109 |
| 4 | 3.4 | 126 |

The extrusion masses containing liquid smoke were found to have significantly higher shear stress values than a similar extrusion mass which did not contain liquid smoke, indicating that an apparent cross-linking effect had taken place. Increasing levels of the smoke condensate resulted in proportionately increasing effects on the rheological properties of the extrusion masses. It has been found that an extrusion mass having higher shear stress values will generally process into casings which have improved finished product strength.

While this invention has been described fully and completely with special emphasis upon certain preferred embodiments, other alternatives and equivalents within the spirit of this invention will be apparent to those skilled in this art, which are also to be included within the scope of the appended claims.

What is claimed is:

1. The process of manufacturing an edible collagen casing by the steps comprising: incorporating liquid-smoke into an extrusion mass of acid-swollen collagen, the amount of liquid-smoke used being 0.01 to 2.0 parts for each part of collagen solids in said extrusion mass; extruding said liquid-smoke containing acid-swollen collagen extrusion mass into the shape of a casing; and drying the resultant edible collagen casing.

2. The process of claim 1 wherein the collagen in the extrusion mass comprises collagen fibrils.

3. The process of manufacturing an edible collagen casing by the steps comprising: incorporating liquid-smoke into a plasticized extrusion mass of acid-swollen collagen fibrils, the amount of liquid-smoke used being 0.01 to 2.0 parts for each part of collagen solids in said extrusion mass; extruding said plasticized liquid-smoke-containing extrusion mass of acid swollen collagen fibrils in the form of a tube; inflating said tube as it is formed at the mouth of the extruder with a gas containing ammonia; supporting said tube until the ammonia has neutralized the acid present in said extrusion mass and the tensile strength of said tube has increased; and drying said tube.

4. The process of claim 3 wherein the extrusion mass is plasticized with glycerin.

5. In the process of preparing an edible collagen continuous film by forming an aqueous slurry of collagen from hide corium which is in finely divided, comminuted form, a fungal protease derived from *Aspergillus oryzae* or *Aspergillus flavus-oryzae*, an edible nontoxic acid and a plasticizer, allowing the resultant swollen collagen dispersion mixture to incubate, extruding the resultant incubated acid-swollen extrusion mass through a slit die extruder to form a continuous film and drying said film, the improvement comprising incorporating liquid smoke into said extrusion mass prior to its extrusion, the amount of liquid smoke used being 0.01 to 2.0 parts for each part of collagen solids in said extrusion mass.

6. The process of manufacturing an edible collagen casing by the steps comprising: incorporating liquid-smoke into an extrusion mass of acid-swollen collagen fibrils, the amount of liquid smoke used being 0.01 to 2.0 parts for each part of collagen solids in said extrusion mass; extruding said liquid-smoke-containing extrusion mass in the form of a tube; inflating said tube as it is formed at the mouth of the extruder with a gas containing ammonia, supporting said tube until the ammonia has neutralized the acid present in the extrusion mass and the tensile strength of said tube has increased; washing said tube; plasticizing said tube, and drying said tube.

* * * * *

UNITED STATES PATENT AND TRADEMARK OFFICE
CERTIFICATE OF CORRECTION

PATENT NO. : 3,894,158
DATED : July 8, 1975
INVENTOR(S) : Albert T. Miller

It is certified that error appears in the above-identified patent and that said Letters Patent are hereby corrected as shown below:

In the Title, delete "Casings".

In Column 1, line 14, "casing" should read --- casings ---.

In Column 1, line 43, "if" should read --- of ---.

In Column 2, line 24, "are" should read -- as --.

In Column 2, line 67, "3,412" should read --- 3,413 ---.

In Column 3, line 65, "patent" should read --- patents ---.

In Column 5, line 67, "synes" should read --- dynes ---.

In Column 6, line 27, insert "water". after "wash"

In Column 7, line 31, "hidecellulose" should read --- hide-cellulose ---.

In Column 8, line 5, "ccommunicate" should read --- communicate ---.

In Column 10, line 41, "1010" should read --- 10 ---.

In Column 10, line 55, "hole" should read --- hide ---.

In Column 13, line 7, insert "ground". after "inch".

In Column 13, line 63, "5.56" should read --- 5/64 ---.

In Column 13, line 68, "34 mil" should read --- 4 mil ---.

In Column 14, line 12, "dip" should read --- die ---.

In Column 15, line 24, "0.825" should read --- 0.852 ---.

In Column 15, lines 44 and 45, "accordingly" should read --- according ---.

Signed and Sealed this twenty-fifth Day of November 1975

[SEAL]

Attest:

RUTH C. MASON
Attesting Officer

C. MARSHALL DANN
Commissioner of Patents and Trademarks